(12) United States Patent
Hough (10) Patent No.: US 8,174,433 B1
(45) Date of Patent: May 8, 2012

(54) BIAS ESTIMATION AND ORBIT DETERMINATION

(75) Inventor: Michael E. Hough, Andover, MA (US)

(73) Assignee: Raytheon Company, Waltham, MA (US)

( * ) Notice: Subject to any disclaimer, the term of this patent is extended or adjusted under 35 U.S.C. 154(b) by 573 days.

(21) Appl. No.: 12/393,133

(22) Filed: Feb. 26, 2009

(51) Int. Cl.
*G01S 13/06* (2006.01)
*G01S 13/42* (2006.01)
*G01S 13/66* (2006.01)
*G01S 13/00* (2006.01)

(52) U.S. Cl. ............. 342/108; 342/73; 342/74; 342/81; 342/104; 342/107; 342/145; 342/146; 342/147; 342/157; 342/175; 342/195

(58) Field of Classification Search .......... 342/59, 342/73–81, 104–115, 175, 195, 27, 28, 118, 342/125–127, 145, 147, 156, 157, 368, 89–103, 342/146; 701/1, 3, 4, 13
See application file for complete search history.

(56) References Cited

U.S. PATENT DOCUMENTS

| | | | | |
|---|---|---|---|---|
| 3,090,583 A | * | 5/1963 | Cronkwright et al. | 701/13 |
| 3,122,741 A | * | 2/1964 | Easton | 342/156 |
| 3,226,713 A | * | 12/1965 | Sorkin et al. | 342/125 |
| 3,560,971 A | * | 2/1971 | Alsberg et al. | 342/59 |
| 3,747,095 A | * | 7/1973 | Wilson | 342/77 |
| 3,996,590 A | * | 12/1976 | Hammack | 342/126 |
| 4,912,475 A | | 3/1990 | Counselman, III | 342/352 |
| 5,093,649 A | * | 3/1992 | Johnson | 342/157 |
| 5,100,084 A | | 3/1992 | Rahn et al. | 244/165 |
| 5,108,050 A | | 4/1992 | Maute | 244/171 |
| 5,184,790 A | | 2/1993 | Fowell | 244/165 |
| 5,344,105 A | | 9/1994 | Youhanaie | 244/3.14 |
| 5,386,370 A | * | 1/1995 | Woo | 342/126 |
| 6,476,758 B1 | * | 11/2002 | Chaput et al. | 342/125 |

(Continued)

FOREIGN PATENT DOCUMENTS

WO  WO 02/02321 A1  1/2002

(Continued)

*Primary Examiner* — Bernarr Gregory
(74) *Attorney, Agent, or Firm* — Pierce Atwood LLP; Joseph M. Maraia (57) ABSTRACT

According to one embodiment, bias estimation and orbit determination include receiving measurements in real time. The measurements include radar measurements and radar array orientation measurements. The radar measurements are generated by a radar system and indicate the location of a target. The radar array orientation measurements are generated by a navigation system and indicate the orientation of a radar array of the radar system. A state variable set is used. The state variable set includes measurement variables and dynamic bias variables. For example, a state variable set may include orbit position, orbit velocity, radar orientation, and radar measurement variables, which in turn may include dynamic bias variables such as orientation bias variables and measurement bias variables. A measurement variable is associated with a measurement, and a dynamic bias variable is associated with bias of a measurement. The following are performed for a number of iterations to yield state value sets for the state variable set: updating a state value set according to the measurements to yield an updated state value set; and predicting a next state value set in accordance with the updated state value set. An orbit path is of the target determined from the state value sets in real time.

21 Claims, 1 Drawing Sheet

U.S. PATENT DOCUMENTS

| | | |
|---|---|---|
| 6,553,286 B2 | 4/2003 | Turner et al. .................... 701/13 |
| 6,657,588 B2 * | 12/2003 | Strickland et al. .............. 342/75 |
| 6,670,913 B1 * | 12/2003 | Talbot et al. .................. 342/127 |
| 6,707,418 B2 * | 3/2004 | Hassebrock et al. .......... 342/145 |
| 6,882,908 B2 | 4/2005 | Laurichesse .................... 701/13 |
| 7,119,732 B1 * | 10/2006 | Lam et al. ..................... 342/175 |
| 2003/0043071 A1 * | 3/2003 | Lilly et al. .................... 342/368 |

FOREIGN PATENT DOCUMENTS

| | | |
|---|---|---|
| WO | WO 2006/004945 A1 | 1/2006 |
| WO | WO 2008/003891 A1 | 1/2008 |
| WO | WO 2008/010577 A1 | 1/2008 |

* cited by examiner

BIAS ESTIMATION AND ORBIT DETERMINATION

GOVERNMENT FUNDING

The U.S. Government may have certain rights in this invention as provided for by the terms of Contract No. HQ00006-01-C-0001 Ground Based Missile Defense X-Band Radar awarded by Missile Defense Agency (MDA).

TECHNICAL FIELD

This invention relates generally to the field of radar systems and more specifically to bias estimation and orbit determination.

BACKGROUND

A radar system may be used to measure the position of a target. Measurements from the radar system may be used to determine the orbit of the target. The measurements, however, typically include biases, or errors. These biases affect the accuracy of the determination of the orbit.

SUMMARY OF THE DISCLOSURE

In accordance with the present invention, disadvantages and problems associated with previous techniques for estimating bias and determining an orbit may be reduced or eliminated.

According to one embodiment, bias estimation and orbit determination include receiving measurements in real time. The measurements include radar measurements and radar array orientation measurements. The radar measurements are generated by a radar system and indicate the location of a target. The radar array orientation measurements are generated by a navigation system and indicate the orientation of the radar system. A state variable set is used. The state variable set includes measurement variables and dynamic bias variables. For example, a state variable set may include orbit position, orbit velocity, radar orientation, and radar measurement variables, which in turn may include dynamic bias variables such as orientation bias variables and measurement bias variables. A measurement variable is associated with a measurement, and a dynamic bias variable is associated with bias of a measurement. The following are performed for a number of iterations to yield state value sets for the state variable set: updating a state value set according to the measurements to yield an updated state value set; and predicting a next state value set in accordance with the updated state value set. An orbit path is of the target determined from the state value sets in real time.

Certain embodiments of the invention may provide one or more technical advantages. A technical advantage of one embodiment may be that a state variable set can be used to determine the orbit of a target. Values for the measurement variables and the dynamic bias variables may be calculated in real time as measurements are received. Calculation of these values in real time also allows for the calculation of the orbit in real time.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
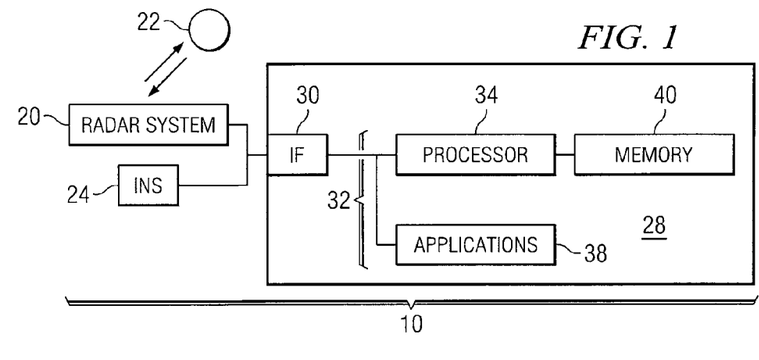
FIG. 1 illustrates one embodiment of a system that may be used to estimate bias and calculate an orbit.
Figure 2:
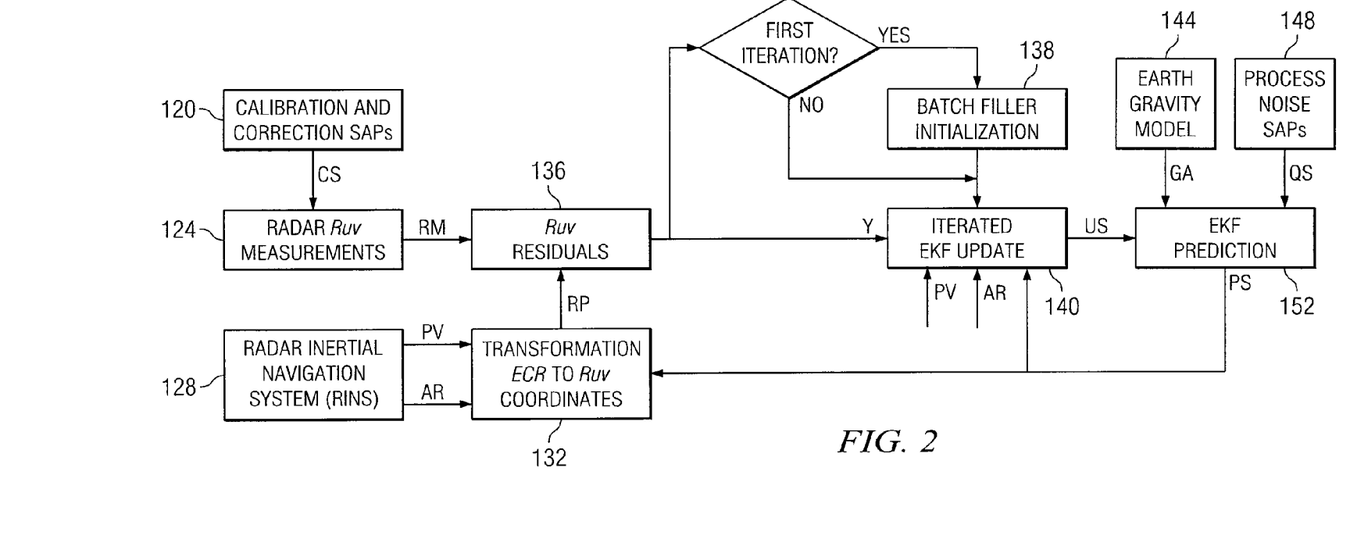
FIG. 2 illustrates one embodiment of a method for calculating the position and velocity of a target as well as biases associated with the position and velocity.

Embodiments of the present invention and its advantages are best understood by referring to FIGS. 1 and 2 of the drawings, like numerals being used for like and corresponding parts of the various drawings.

FIG. 1 illustrates one embodiment of a system 10 that may be used to estimate bias and calculate an orbit. In certain embodiments, system 10 uses a state variable set to determine the orbit of a target. The state variable set may include orbit position, orbit velocity, radar orientation, and radar measurement variables, which in turn may include dynamic bias variables such as orientation bias variables and measurement bias variables. A measurement variable represents a measurement, and a dynamic bias variable represents the bias of a measurement. Values for the measurement variables and the dynamic bias variables may be calculated in real time as measurements are received. Calculation of these values in real time also allows for the calculation of the orbit in real time.

In the illustrated embodiment, system 10 comprises a radar system 20, an inertial navigation system (INS) 24, and a computing system 28 coupled as shown. A target 22 is tracked by radar system 20. Computing system 28 includes an interface 30, logic 32 (such as a processor 34 and applications 38), and a memory 40 coupled as shown.

A target 22 may be any stationary or moving object. In certain embodiments, target 22 may be an object that has an orbit. For example, target 22 may be a satellite. Radar system 20 tracks target 22 to generate radar measurements that describe the location of target 22 and that may be used to determine an orbit of target 22. Radar system 20 has a radar array with antennas that transmit and receive signals. In certain embodiments, radar measurements may comprise three-dimensional position measurements. Distance (or time delay) may be measured relative to radar system 20, and directional (or angle) measurements may be reported in the Cartesian radar-face coordinates of radar system 20. Inertial Navigation System (INS) 24 generates radar array orientation measurements that describe the orientation of the radar array of radar system 20. INS 24 may be mounted on the radar face of radar system 20, and may provide the position, velocity, orientation, and angular rate.

Logic 32 utilizes a state variable set comprising one or more measurement variables and one or more dynamic bias variables. For example, a state variable set may include orbit position, orbit velocity, radar orientation, and radar measurement variables, which in turn may include dynamic bias variables such as orientation bias variables and measurement bias variables. A measurement variable represents a measurement, and a dynamic bias variable represents the bias of a measurement. Logic 32 may also utilize a covariance variable that correlates the measurement variables and the dynamic bias variables. In certain embodiments, logic 32 utilizes an extended Kalman filter (EKF) to perform the calculations.

In certain embodiments, logic 32 receives measurements in real time. The measurements comprise radar measurements and radar array orientation measurements. The radar measurements are generated by radar system 20 and describe the location of target 22. The radar array orientation measurements are generated by INS 24 and describe the orientation of the radar array of radar system 20.

Logic 32 may generate an initial state value set by: (1) comparing one or more current measurement values with the measurements; and (2) calculating one or more next measurement values in accordance with the comparison using a batch filter for a number of iterations. Logic 32 may then combine the initial state value set with one or more prior bias values and one or more bias covariances.

Logic 32 iteratively calculates state values for the state variables by comparing a state value set with the measurements and calculating a next state value set in accordance with the comparison. The comparing may involve comparing the current state value set and a current covariance value of a covariance variable, and the calculating may involve calculating the next state value set and a next covariance value of the covariance variable in accordance with the comparison. Logic 32 may then determine an orbit path of the target from the state values.

A component of system 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the methods of the embodiments may be performed by one or more computer readable media encoded with a computer program, software, computer executable instructions, and/or instructions capable of being executed by a computer. In particular embodiments, the methods of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium, which may exclude signals. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

FIG. 2 illustrates one embodiment of a method for calculating the position and velocity of a target as well as biases associated with the position and velocity.

In the embodiment, the following abbreviations are used:

| | |
|---|---|
| CS: | Parameters used to calibrate and/or otherwise correct Ruv measurements. |
| RM: | Corrected Ruv measurements, where R represents range, u represents the azimuthal angle, and v represents the vertical angle. |
| PV: | INS position and velocity provided by INS 24, which may be expressed in Earth Centered Rotating (ECR) coordinates. |
| AR: | INS orientation angles and angular rates provided by INS 24. |
| RP: | Predicted Ruv position estimate. |
| Y: | Ruv measurement residual calculated from corrected Ruv measurements RM and predicted Ruv position estimate RP. |
| US: | Updated position, velocity, and bias. The updated position and velocity may be expressed in Earth Centered Inertial (ECI) coordinates, and the bias may be expressed in Range, Azimuth, and Elevation (RAE) coordinates. |
| GA: | Gravitational acceleration and gravity gradient matrix, which may be expressed in ECI coordinates. |
| QS: | Velocity and bias process noise matrices for INS 24. The bias process noise matrices may be expressed in RAE coordinates. |
| PS: | Predicted position, velocity, and bias. The predicted position and velocity may be expressed in ECI coordinates, and the bias may be expressed in RAE coordinates. |

In certain embodiments, Ruv measurements represent radar measurements; INS position and velocity and INS orientation angles and angular rates represent radar array orientation measurements; and updated and predicted position, velocity, and bias represent state value sets of a state variable set.

Steps 120 and 124 describe calibration and/or other correction of radar measurements from radar system 20 to yield corrected radar measurements. In the illustrated embodiment, calibration and/or correction site adjustable parameters (SAPs) provide parameters CS at step 120. The Ruv measurements are calibrated using parameters CS at step 124 to yield corrected Ruv measurements RM.

In certain embodiments, radar system 20 may provide measurements of range distance $\rho$ and range rate $\dot{\rho}$ in any suitable manner. In some cases, a phased-array radar using a linear FM ("chirp") waveform measures a linear combination $\rho_m = \rho + \tau_{RD}\dot{\rho}$ of range distance $\rho$ and range rate $\dot{\rho}$, where $\tau_{RD}$ represents the range-Doppler coupling time, which can be determined from the radar center frequency, pulse length, chirp bandwidth, and chirp polarity. Distance $\rho$ and rate $\dot{\rho}$ may be measured by transmitting two substantially simultaneous pulses with positive and negative $\tau_{RD}$ values. Alternatively, $\rho$ and $\dot{\rho}$ may be determined by track processing of $\rho_m$. In other cases, range-Doppler radars can provide direct measurements of $\dot{\rho}$.

In certain embodiments, radar angle measurements provide azimuthal and vertical direction cosines u and v, respectively, of the unit line-of-sight (LOS) vector $\vec{\lambda}$ in Cartesian radar-face coordinates:

$$\vec{\lambda} = [w\ u\ v]^T$$

$$w = \sqrt{1 - u^2 - v^2}$$

where w is specified by $|\vec{\lambda}| = 1$. Typically, w≡1 and u=v=0 when the LOS is at radar boresight, and 0<w<1 otherwise. Radar angle measurements may be obtained using any suitable technique, such as a monopulse technique.

In certain embodiments, radar range and angle measurement biases $\vec{\delta\eta} = [\delta\rho\ \delta u\ \delta v]^T$ may be modeled as the sum of static and dynamic bias $\vec{\delta\eta} = \vec{\delta\eta}_S + \vec{\delta\eta}_D$ expressed in radar-face coordinates. Dynamic bias $\vec{\delta\eta}_D$ arises primarily from uncompensated tropospheric refraction errors, which fluctuate with the LOS elevation and local atmospheric conditions along the radar ray to the target. Static (or time-invariant) biases include constant, scale factor, and misalignment terms:

$$\vec{\delta\eta}_S = \begin{bmatrix} \delta\rho_B + \kappa_\rho \rho \\ \delta u_B + \kappa_u u - \delta\varphi v \\ \delta v_B + \kappa_v v + \delta\varphi u \end{bmatrix}$$

where $\delta\rho_B$, $\delta u_B$, and $\delta v_B$ are constant biases; $\kappa_\rho$, $\kappa_u$, and $\kappa_v$ are scale factor biases; and $\delta\varphi$ is a clock error measured around the radar boresight. Constant biases are usually removed during the radar calibration process. Scale factor and misalignment biases can become significant at large off-boresight scan angles, but these biases may be ignored when the radar LOS is near boresight (i.e., u, v≈0). In certain embodiments, static biases may be ignored, so the radar bias states may be regarded as equivalent to the dynamic bias ($\vec{\delta\eta} = \vec{\delta\eta}_D$).

Steps 128 and 132 describe collection and transformation of radar array orientation measurements to the same coordinate system as the radar measurements to yield a position estimate. In the illustrated embodiment, INS 24 generates INS position and velocity values PV and INS orientation angles and angular rates AR of radar system 20 at step 128. The INS position and velocity values PV are transformed from ECR coordinates into Ruv coordinates at step 132 to yield a prior Ruv position estimate RP.

Orientation may be described in any suitable manner. In certain embodiments, orientation may be reported as a yaw angle $\psi$ measured from the East in the local horizontal plane, a pitch angle $\theta$ measured upwards from the local horizontal to the radar boresight, and a roll angle $\phi$ measured around radar boresight.

The transformation matrix $\mathfrak{R}$ from the inertial frame to radar-face coordinates may be specified by:

$$\mathfrak{R}\ (\phi,\theta,\psi) = \mathfrak{R}_1(\phi)\mathfrak{R}_2(-\theta)\mathfrak{R}_3(\psi)\mathfrak{R}_s(\alpha_s, L_s)$$

where numerical subscripts $\mathfrak{R}_j$ identify the axis of rotation. The transformation $\mathfrak{R}_s\ (\alpha_s, L_s)$ from the inertial frame to topocentric East, North Up (ENU) coordinates at the radar depends on the radar right ascension $\alpha_s$ and geodetic latitude $L_s$.

INS model models navigation and orientation biases in any suitable manner. In certain embodiments, navigation and orientation biases may arise from gyroscope and accelerometer bias, scale factor, and drift errors. Horizontal (North-pointing) misalignments may cause a yaw bias $\delta\psi$, whereas vertical misalignments may cause a pitch bias $\delta\theta$ and/or a roll bias $\delta\phi$. If navigation accuracy is precise, errors in $\alpha_s$ and/or $L_s$ may be neglected.

Steps 136 through 152 describe an iterated process that updates a state value set according to radar measurements and radar array orientation measurements and a previously predicted state value set, and then predicts a next state value set from the updated state value set. Step 136 describes calculation of a measurement residual from the radar measurements and the radar array orientation measurements. In the illustrated embodiment, Ruv measurement residuals Y are computed from the corrected Ruv measurements RM and the prior Ruv position estimate RP at step 136. A measurement residual Y may be the difference between the measurement RM and the estimate RP. The biases may be extracted by identifying the biases using time signatures and extracting the identified biases.

In certain embodiments, batch filtering may be performed for the first iteration at step 138 to initialize an extended Kalman filter (EKF) to generate an initial state value set. In some cases, the EKF may be initialized at radar acquisition $t_0$ with prior estimates of the state vector (representing a state variable set) and covariance matrix. If prior information (e.g., from other sensors) is not available, a batch filter may be used to determine an initial orbit estimate and covariance from radar detections collected in a short time interval $t \in [t_0\ t_m]$, such as a time interval less than 10 seconds. In certain cases, a batch filter may provide reasonably accurate estimates (i.e., for linear error response of the recursive filter) and properly correlated covariances, which may enhance velocity error convergence. A preliminary returns-to-track association process may be used for track initialization on multiple objects.

Maximum-likelihood estimates of initial position $\hat{\vec{r}}_0$, inertial velocity $\hat{\vec{v}}_0$ and the corresponding 6×6 covariance matrix $\hat{M}_0$ may be determined with an iterated batch filter:

$$\hat{M}_0^{(i+1)} = (H^T W^{-1} H)^{-1}$$

$$\begin{bmatrix} \hat{\vec{r}}_0^{(i+1)} \\ \hat{\vec{v}}_0^{(i+1)} \end{bmatrix} = \begin{bmatrix} \hat{\vec{r}}_0^{(i)} \\ \hat{\vec{v}}_0^{(i)} \end{bmatrix} + \hat{M}_0^{(i+1)} H^T W^{-1} \begin{bmatrix} \vec{y}_0 - \vec{h}_0\left(\hat{\vec{r}}_0^{(i)}, \hat{\vec{v}}_0^{(i)}\right) \\ \vec{y}_1 - \vec{h}_0\left(\hat{\vec{r}}_1^{(i)}, \hat{\vec{v}}_1^{(i)}\right) \\ \vdots \\ \vec{y}_m - \vec{h}_0\left(\hat{\vec{r}}_m^{(i)}, \hat{\vec{v}}_m^{(i)}\right) \end{bmatrix}$$

where superscript i denotes iteration number and subscripts indicate time. Bias estimates are not determined by this process, so the batch residuals may be formed using the bias-free measurement function $\vec{h}_0$. Batch estimates and covariances from the preceding iteration step are predicted from acquisition to each of the radar detection times $t_m$:

$$\begin{bmatrix} \hat{\vec{r}}_n^{(i)} \\ \hat{\vec{v}}_n^{(i)} \end{bmatrix} = \Phi\left(\hat{\vec{r}}_0^{(i)}, \hat{\vec{v}}_0^{(i)}, t_n - t_0\right) \begin{bmatrix} \hat{\vec{r}}_0^{(i)} \\ \hat{\vec{v}}_0^{(i)} \end{bmatrix} \quad (0 \le n \le m)$$

$$\hat{M}_{(n)}^{(i)} = \Phi\left(\hat{\vec{r}}_0^{(i)}, \hat{\vec{v}}_0^{(i)}, t_n - t_0\right) \hat{M}_0^{(i)} \Phi^T\left(\hat{\vec{r}}_0^{(i)}, \hat{\vec{v}}_0^{(i)}, t_n - t_0\right)$$

For short prediction times, the effects of higher-order gravitational perturbations (such as $J_2$) may be neglected, and the state-transition matrix may be approximated by the closed-form Keplerian transition matrix (superscripts omitted):

$$\Phi(\vec{r}_0, \vec{v}_0, t_n - t_0) = \begin{bmatrix} f_0 I_3 & g_0 I_3 \\ \dot{f}_0 I_3 & \dot{g}_0 I_3 \end{bmatrix}$$

where $f_0$ and $g_0$ are Lagrangian coefficients that depend on the orbital elements determined from $\vec{r}_0$ and $\vec{v}_0$. Alternatively, $J_2$ perturbations can be included, in which case $\Phi$ may be determined by numerical integration of the matrix-differential equation:

$$\dot{\Phi}=F_6(\vec{r},\vec{v})\Phi$$

which are coupled to the orbit equations, and $F_6$ is the 6×6 upper-left submatrix of $F(\vec{x})$. The measurement sensitivity matrix is specified by:

$$H = \begin{bmatrix} C_6(\hat{\vec{r}}_0^{(i)}, \hat{\vec{v}}_0^{(i)})\Phi(\hat{\vec{r}}_0^{(i)}, \hat{\vec{v}}_0^{(i)}, 0) \\ C_6(\hat{\vec{r}}_1^{(i)}, \hat{\vec{v}}_1^{(i)})\Phi(\hat{\vec{r}}_0^{(i)}, \hat{\vec{v}}_0^{(i)}, t_1-t_0) \\ \vdots \\ C_6(\hat{\vec{r}}_m^{(i)}, \hat{\vec{v}}_m^{(i)})\Phi(\hat{\vec{r}}_0^{(i)}, \hat{\vec{v}}_0^{(i)}, t_m-t_0) \end{bmatrix}$$

where $C_6$ denotes corresponding 3×6 upper-left submatrix of $C(\vec{x})$. The weighting matrix is assembled with the time sequence of inverse residuals covariance matrices:

$$W = \begin{bmatrix} N_0^{-1} & O_3 & \cdots & O_3 \\ O_3 & N_1^{-1} & \cdots & O_3 \\ \vdots & \vdots & \ddots & \vdots \\ O_3 & O_3 & \cdots & N_m^{-1} \end{bmatrix}$$

$$N_n = C_6(\hat{\vec{r}}_n^{(i)}, \hat{\vec{v}}_n^{(i)})\hat{M}_n^{(i)} C_6^T(\hat{\vec{r}}_n^{(i)}, \hat{\vec{v}}_n^{(i)}) + R_n \quad (0 \le n \le m)$$

The nonlinear batch estimation process may be iterated to improve estimation accuracy and covariance fidelity. At radar acquisition (i=1), the first guesses $\hat{\vec{r}}_0^{(1)}$, $\hat{\vec{v}}_0^{(1)}$, and $\overline{M}_0^{(1)}$ may be determined with a polynomial-batch filter. In certain embodiments, the batch estimates and covariances may be iterated at most five times, using the same set of detections. A properly conditioned covariance matrix may be generated using at least 25 to 50 detections.

In certain embodiments, the state vector and covariance matrix at acquisition combine the batch orbit determination results with prior bias estimates and bias covariances (superscripts omitted):

$$\hat{\vec{x}}_0 = \begin{bmatrix} \hat{\vec{r}}_0 \\ \hat{\vec{v}}_0 \\ \vec{0}_6 \end{bmatrix}, \hat{P}_0 = \begin{bmatrix} \hat{M}_0 + M_B & O_{6\times 6} \\ O_{6\times 6} & D_B \end{bmatrix}$$

Prior bias estimates are zero because the biases are initially unknown. Bias statistics are included in a 6×6 diagonal matrix $D_B$ of initial bias covariances.

Examples of values of the initial bias covariances include:
1. Yaw orientation bias: a standard deviation of 150 μrad;
2. Pitch and roll orientation bias (each axis): a standard deviation of 80 μrad;
3. Dynamic range bias: a standard deviation of 5 m; and
4. Dynamic u, v bias (each axis): a standard deviation of 500 μrad Orientation bias statistics reflect typical INS erection and alignment uncertainties. The yaw (or alignment) uncertainty is typically larger than the pitch and roll (or erection) uncertainties. Ruv dynamic bias statistics are typical tropospheric refraction uncertainties in range and elevation at low elevations (<5°) and for a 10% compensation error. Although tropospheric azimuth uncertainties are usually small relative to elevation uncertainties, the same uncertainties are assigned to the dynamic u and v biases. As $\vec{r}_0$ and $\vec{v}_0$ contain biases (because the measurements are biased), $\vec{M}_0$ is inflated with a 6×6 bias covariance matrix $M_B$ that is consistent with $D_B$.

Step 140 describes updating a state value set according to radar measurements and radar array orientation measurements and a previously predicted state value set. In the illustrated embodiment, position, velocity, and bias are updated at step 140 according to Ruv measurement residual Y, position and velocity PV, orientation angles and angular rates AR, and predicted position, velocity, and bias PS to yield updated position, velocity, and bias US.

Bias-state observability and separability properties are dependent on the mathematical models for the bias influence in the measurement residual and in the measurement sensitivity matrix used for the filter gain matrix. In certain embodiments, the radar measurement $\vec{y}$ may be specified in radar-face coordinates:

$$\vec{y} = [\rho + \tau_{RD}\rho \; u \; v]^T + \delta\vec{\eta} + \vec{v}$$

$$R = E\{\vec{v}\vec{v}^T\} = \text{diag}\{\sigma_{\rho+\tau}^2 \; \sigma_u^2 \; \sigma_v^2\}$$

Radar measurement $\vec{y}$ may be corrupted by additive measurement bias errors $\delta\vec{\eta}$ and by zero-mean, uncorrelated Gaussian random errors $\vec{v}$ with a diagonal measurement noise matrix R. Radar measurement $\vec{y}$ is independent of the orientation bias $\delta\vec{\xi}$.

Prior estimates of the radar measurements may be determined from radar position and inertial velocity $\vec{R}_S$ and $\vec{V}_s$, prior orbit estimates $\vec{r}$ and $\vec{v}$, and the transformation $\mathfrak{R}$, which contains the orientation biases:

$$\vec{\rho} = \vec{r} - \vec{R}_s$$

$$\rho = |\vec{\rho}|$$

$$\vec{\lambda} = [\overline{w} \; \overline{u} \; \overline{v}]^T = \frac{1}{\rho}\mathfrak{R}\vec{\rho}$$

$$\dot{\rho} = [\mathfrak{R}(\vec{v}-\vec{V}_s)]^T\vec{\lambda}$$

The estimated radar measurement $\vec{y}$ depends on $\overline{\rho}$, $\dot{\overline{\rho}}$, $\overline{u}$, $\overline{v}$, and prior estimates of the orientation and measurement biases $\delta\vec{\xi}$ and $\delta\vec{\eta}$:

$$\vec{\overline{y}} = h(\vec{\overline{x}}) = \vec{h}_0(\vec{r},\vec{v}) - J_\xi\delta\vec{\xi} + \delta\vec{\eta}$$

$$\vec{h}_0 = [\overline{\rho} + \tau_{RD}\dot{\overline{\rho}} \; \overline{u} \; \overline{v}]^T$$

$$J_\xi = \frac{\partial(\rho + \tau_{RD}\dot{\rho}, u, v)}{\partial(\psi, \theta, \phi)}$$

$$\frac{\partial(\rho + \tau_{RD}\dot{\rho})}{\partial(\psi, \theta, \phi)} = -\frac{1}{2}\overline{\rho}[\cos^2\theta\delta\psi \quad \delta\theta \quad 0]$$

where $$\frac{\partial(u, v)}{\partial(\psi, \theta, \phi)}$$

is specified by selection of the appropriate rows of the 3×3 Jacobian matrix:

$$\frac{\partial(w, u, v)}{\partial(\psi, \theta, \phi)} = \Omega(\overline{\lambda})\overline{\mathfrak{J}}$$

Orientation biases are implicit in $\vec{h}_0$, so the $J_{86}\,\delta\vec{\xi}$ term is subtracted from (rather than added to) $\vec{h}_0$ because $\vec{y}$ is independent of $\delta\vec{\xi}$. (Equivalently, the $J_{86}\,\delta\vec{\xi}$ term is added to $\vec{y}$ when the measurement residual is formed because it is otherwise independent of orientation biases.) Orientation biases may cause second-order range corrections that are negative (i.e., effectively a $\cos(\bullet)-1$ term) because $\overline{\rho}$ is projected onto a misaligned unit LOS direction. Range is independent of $\delta\vec{\xi}$ to first order, so the second-order term provides mathematical observability of the orientation biases, although this term is not advantageous unless high precision wideband range measurements are available.

The linearized measurement sensitivity matrix is determined by partial differentiation of the measurement function with respect to the state variables:

$$C(\vec{x}) = \begin{bmatrix} \frac{\partial \vec{h}_0}{\partial \vec{r}^T} & \frac{\partial \vec{h}_0}{\partial \vec{v}^T} & -J_\xi & I_3 \end{bmatrix}$$

$$\frac{\partial \vec{h}_0}{\partial \vec{r}^T} = \frac{\partial(\rho, u, v)}{\partial(x, y, z)}, \quad \frac{\partial \vec{h}_0}{\partial \vec{v}^T} = \begin{bmatrix} \tau_{RD}\partial\dot{\rho}/\partial(\dot{x}, \dot{y}, \dot{z}) \\ O_{2\times 3} \end{bmatrix}$$

Partial derivatives of $\vec{h}_0$ appearing in $C(\vec{x})$ are selected from the appropriate rows and columns of the 4×3 Jacobian transformation matrix:

$$\frac{\partial(\rho, w, u, v)}{\partial(x, y, z)} = \frac{\partial(\dot{\rho}, \dot{w}, \dot{u}, \dot{v})}{\partial(\dot{x}, \dot{y}, \dot{z})} = \begin{bmatrix} \overline{\lambda}^T \mathfrak{R} \\ \frac{1}{\rho}(I_3 - \overline{\lambda}\overline{\lambda}^T)\mathfrak{R} \end{bmatrix}$$

In certain embodiments, EKF updates are iterated for each reported detection to mitigate the effects of measurement nonlinearities arising from ECI state estimates. In other embodiments, iteration is not performed for updates in radar range-angle coordinates. In the embodiments, the transformations to range-angle coordinates and back to ECI coordinates (for prediction) essentially add and subtract INS biases in a self-canceling way, which may compromise observability.

The iteration process begins with a prior estimate and covariance:

$$\hat{\vec{x}}_n^{(1)} = \vec{x}_n, P_n^{(1)} = M_n$$

where superscripts to indicate the iteration number and subscripts to indicate the time $t_n$. The initial estimate $\vec{x}_0$ and covariance $M_0$ (i.e., at acquisition time $t_0$) may be provided by the batch initialization process.

On subsequent updates, $\vec{x}_0$ and $M_0$ are specified by the predictions (represented by PS) from the previous recursive update step. For $i \geq 1$, the nonlinear functions $C_n^{(i)} = C(\hat{\vec{x}}_n^{(i)})$ and $\vec{h}(\hat{\vec{x}}_n^{(i)})$ are evaluated with the prior estimate, as are the following:

$$\vec{\epsilon}_n^{(i)} = \vec{y}_n - \vec{h}(\hat{\vec{x}}_n^{(i)}) - C_n^{(i)}(\vec{x}_n - \hat{\vec{x}}_n^{(i)})$$

$$N_n^{(i)} = C_n^{(i)} M_n (C_n^{(i)})^T + R_n$$

$$K_n^{(i)} = M_n (C_n^{(i)})^T (N_n^{(i)})^{-1}$$

The EKF state estimate and covariance are then updated (represented by US):

$$\hat{\vec{x}}_n^{(i+1)} = \vec{x}_n + K_n^{(i)} \vec{\epsilon}_n^{(i)}$$

$$P_n^{(i+1)} = K_n^{(i)} R_n (K_n^{(i)})^T + [I_{12} - K_n^{(i)} C_n^{(i)}] M_n [I_{12} - K_n^{(i)} C_n^{(i)}]^T$$

State estimation accuracy and covariance fidelity improve with each iteration, provided the state variables are sufficiently observable. The first iteration (i=1) may be the conventional EKF update because the measurement residual (Represented by Y) is $\vec{\epsilon}_n^{(1)} = \vec{y}_n - \vec{h}(\hat{\vec{x}}_n^{(1)})$ and the correction term is zero. Nonlinearities may cause differences in the statistics of $\vec{\epsilon}_n^{(1)}$ and its covariance $N_n^{(1)}$. $P_n^{(1)}$ is based on $N_n^{(1)}$, so, in some cases, $P_n^{(1)}$ may have poor covariance fidelity because $P_n^{(1)}$ may not accurately represent the statistics of the estimation errors. In subsequent iterations $i \geq 2$, the nonlinear functions $\vec{h}(\hat{\vec{x}}_n^{(i)})$ and $C(\hat{\vec{x}}_n^{(i)})$ and residual $\vec{\epsilon}_n^{(i)}$ are evaluated with improving information. In certain cases, two or three iterations may be sufficient.

At time $t_n$, the same prior information $\vec{x}_0$ and $M_0$, radar measurements $\vec{y}_n$ and measurement noise matrix $R_n$ are used on each iteration step. $M_n$ contains information that correlates the dynamic bias variables, for example, correlates errors in position states (which are directly observable from $\vec{y}_n$) with errors in velocity states and with errors in the bias states. As the filter gain matrix is proportional to these correlations, velocity and bias state errors can be corrected with information in the position measurement residual.

Steps 144 through 152 describe predicting a next state value set from the updated state value set using a model that can be used to determine a next state from a current state, such as an orbital model that can be used to determine a next path point from a current path point. In the illustrated embodiment, Earth gravity model provides a gravitational acceleration and gravity gradient matrix GA at step 144. Process noise SAPs provide velocity and bias process noise matrices QS at step 148. A predicted state value set PS is calculated at step 152 according to the updated position, velocity, and bias US, matrix GA, and matrices QS. In certain embodiments, position, velocity, and bias may be calculated in real time, which may allow for determination of the orbit in real time.

A filter state vector may represent a state variable set, and may include any suitable measurement variables and/or dynamic bias variables. For example, a state variable set may include orbit position, orbit velocity, radar orientation, and radar measurement variables, which in turn may include dynamic bias variables such as orientation bias variables and measurement bias variables.

In certain embodiments, the filter state vector $\vec{x}$ includes the inertial position $\vec{r}$ and inertial velocity $\vec{v}$ of a target, orientation biases $\delta\vec{\xi}$, and measurement biases $\delta\vec{\eta}$:

$$\vec{x} = [\vec{v}^T(t) \; \vec{v}^T(t) \; \delta\vec{\xi}^T(t) \; \delta\vec{\eta}^T(t)]^T$$
$$\vec{r} = [x \; y \; z]^T, \vec{v} = [\dot{x} \; \dot{y} \; \dot{z}]^T$$

$$\delta\vec{\xi} = [\delta\psi \; \delta\theta \; \delta\phi]^T$$

$$\delta\vec{\eta} = [\delta\rho \; \delta u \; \delta v]^T$$

Orientation biases include a yaw bias $\delta\psi$, a pitch bias $\delta\theta$, and a roll bias $\delta\phi$. Radar measurement biases include a range bias $\delta\rho$ and direction-cosine biases $\delta u, \delta v$.

Orbital motion may be described in any suitable manner. At altitudes above 500 km where drag is not important, orbital motion may be described by:

$$d\vec{r}/dt = \vec{v}$$

$$\frac{d\vec{v}}{dt} = -\frac{\mu_e}{r^2}\left\{\frac{\vec{r}}{r} - \frac{3J_2 R_e^2}{2r^2}\left[\left(\frac{5z^2}{r^2} - 1\right)\frac{\vec{r}}{r} - \frac{2z}{r}\hat{Z}\right]\right\} + \vec{\nabla}U$$

where $\mu_e$ represents the Earth's gravitational parameter, $R_e$ represents equatorial radius, and $\hat{Z}$ represents unit-polar axis, and time derivatives are taken with respect to the ECI frame. The dominant gravitational accelerations arise from the central, inverse-square gravity field and from Earth oblateness (modeled by the $J_2$ coefficient). As each higher-order zonal or tesseral harmonic term of the geopotential function U is $O(J_2^2)$, the higher-order disturbing acceleration $\vec{\nabla}U$ may be at most 15-20 μg at orbital altitudes of 700 km, depending on the geographic location of the sub-satellite point. For short data collection and prediction intervals, $\vec{\nabla}U$ may be neglected.

Orientation biases may fluctuate as the radar array (on which INS 24 is mounted) follows the target trajectory in elevation and azimuth. Differential equations may be derived by linearization of the Euler equations specifying the angular rates:

$$\frac{d}{dt}(\delta\vec{\xi}) = \Lambda(\theta,\phi)\delta\vec{\xi} + \mathfrak{J}^{-1}\delta\vec{\omega}_s$$

$$\Lambda(\theta,\phi,\vec{\omega}_s) = \left[\frac{\partial\mathfrak{J}^{-1}}{\partial\psi}\vec{\omega}_s \quad \frac{\partial\mathfrak{J}^{-1}}{\partial\theta}\vec{\omega}_s \quad \frac{\partial\mathfrak{J}^{-1}}{\partial\phi}\vec{\omega}_s\right]$$

$$\mathfrak{J}^{-1}(\theta,\phi) = \frac{1}{\cos\theta}\begin{bmatrix} 0 & \sin\phi & \cos\phi \\ 0 & -\cos\theta\cos\phi & \cos\theta\sin\phi \\ \cos\theta & -\sin\theta\sin\phi & -\sin\theta\cos\phi \end{bmatrix}$$

$$\frac{\partial\mathfrak{J}^{-1}}{\partial\psi} = O_3$$

-continued $$\frac{\partial\mathfrak{J}^{-1}}{\partial\theta} = \frac{1}{\cos\theta}\begin{bmatrix} 0 & 0 & 0 \\ 0 & \sin\theta\cos\phi & -\sin\theta\sin\phi \\ -\sin\theta & -\cos\theta\sin\phi & -\cos\theta\cos\phi \end{bmatrix} + \tan\theta\mathfrak{J}^{-1}$$

$$\frac{\partial\mathfrak{J}^{-1}}{\partial\phi} = \frac{1}{\cos\theta}\begin{bmatrix} 0 & \cos\phi & -\sin\phi \\ 0 & \cos\theta\sin\phi & \cos\theta\cos\phi \\ 0 & -\sin\theta\cos\phi & \sin\theta\sin\phi \end{bmatrix}$$

where $\vec{\omega}_s$ represents the Earth-relative angular rate and $\delta\vec{\omega}_s$ represents bias error of the rate in radar-face coordinates. The rate bias error $\delta\vec{\omega}_s$ is a zero-mean, Gaussian random vector with statistics:

$$E\{\delta\vec{\omega}_s\} = \vec{0}_3, \; E\{\delta\vec{\omega}_s \delta\vec{\omega}_s^T\} = \begin{bmatrix} q_\omega & 0 & 0 \\ 0 & q_\omega & 0 \\ 0 & 0 & q_\omega \end{bmatrix}$$

Measurement biases may fluctuate with local atmospheric conditions along the radar ray. Dynamic bias errors may be modeled by a linear, first-order Markov model:

$$\frac{d}{dt}(\delta\vec{\eta}) + \frac{1}{\tau_A}\delta\vec{\eta} = \frac{1}{\tau_A}\delta\vec{f}$$

where the disturbance input $\delta\vec{f}$ is zero-mean, Gaussian random vector with statistics:

$$E\{\delta\vec{f}\} = \vec{0}_3, \; E\{\delta\vec{f}\delta\vec{f}^T\} = \begin{bmatrix} q_\rho & 0 & 0 \\ 0 & q_{uv} & 0 \\ 0 & 0 & q_{uv} \end{bmatrix}$$

The constant variances $q_\rho$ and $q_{uv}$ may be interpreted as process noise commands to the covariance equations of the $1^{st}$ order Markov dynamic bias model. The Markov time constant $\tau_A$ varies with the LOS elevation $\gamma$, with the elevation rate $\dot\gamma$, and with the elevation-dependent refraction error $\epsilon(\gamma)$ and its elevation gradient:

$$\tau_A = -\frac{\epsilon(\gamma)}{\dot\gamma d\epsilon/d\gamma}$$

In certain situations, clear-air (weather-free) tropospheric refraction causes elevation-dependent errors $\epsilon(\gamma)$ in elevation and range that may be mathematically approximated by an exponential function:

$$\epsilon(\gamma) = \epsilon_0 e^{-b\gamma}$$

When $\epsilon_0$ and b are constant parameters, the error time derivative may be expressed by:

$$\dot\epsilon = \frac{d\epsilon}{d\gamma}\dot\gamma = -(b\dot\gamma)\epsilon$$

The quantity in parentheses may be replaced by an equivalent time constant:

$$\tau_A = \frac{1}{b\dot\gamma}$$

In reality, the gradient parameter $$b\left(=-\frac{1}{\varepsilon}\frac{d\varepsilon}{d\gamma}\right)$$

is also elevation dependent because the error slope $$\frac{d\varepsilon}{d\gamma}$$

also depends on elevation. It follows that $\tau_A$ may be expressed by:

$$\tau_A = -\frac{\varepsilon(\gamma)}{\dot\gamma d\varepsilon/d\gamma}$$

Referring back to the Markov time constant, as $$\frac{d\varepsilon}{d\gamma} < 0,$$

stable error dynamics ($\tau_A > 0$) may occur with increasing elevation ($\dot\gamma > 0$), and unstable error dynamics ($\tau_A < 0$) may occur with decreasing elevation ($\dot\gamma > 0$). Time $\tau_A$ is undefined at peak elevation because $\dot\gamma = 0$, but a maximum positive $\tau_A$ value may be assigned to avoid singularities.

The covariance prediction equations may be given by:

$$\frac{dP}{dt} = F(\vec x)P + PF(\vec x)^T + GQG^T$$

$$F(\vec x) = \begin{bmatrix} O_3 & I_3 & O_3 & O_3 \\ \Gamma & O_3 & O_3 & O_3 \\ O_3 & O_3 & \Lambda & O_3 \\ O_3 & O_3 & O_3 & -(1/\tau_A)I_3 \end{bmatrix}$$

$$G = \begin{bmatrix} O_3 & O_3 & O_3 & O_3 \\ O_3 & I_3 & O_3 & O_3 \\ O_3 & O_3 & \Im^{-1} & O_3 \\ O_3 & O_3 & O_3 & (1/\tau_A)I_3 \end{bmatrix}$$

where the gravity-gradient matrix $\Gamma$ is complete to $O(J_2)$:

$$\Gamma = \frac{\partial \vec g}{\partial \vec r^T} = \frac{\mu_e}{r^3}\left(\frac{3\vec r \vec r^T}{r^2} - I_3\right) + \frac{3\mu_e J_2 R_e^2}{2r^5}\Gamma_2$$

$\Gamma_2 =$ $$\begin{bmatrix} \frac{5(x^2+z^2)}{r^2} - \frac{35x^2z^2}{r^4} - 1 & \frac{5xy}{r^2} - \frac{35xyz^2}{r^4} & \frac{15xz}{r^2} - \frac{35xz^3}{r^4} \\ \frac{5xy}{r^2} - \frac{35xyz^2}{r^4} & \frac{5(y^2+z^2)}{r^2} - \frac{35y^2z^2}{r^4} - 1 & \frac{15yz}{r^2} - \frac{35yz^3}{r^4} \\ \frac{15xz}{r^2} - \frac{35xz^3}{r^4} & \frac{15yz}{r^2} - \frac{35yz^3}{r^4} & \frac{30z^2}{r^2} - \frac{35z^4}{r^4} - 3 \end{bmatrix}$$

State estimation errors $\hat{\delta\vec x}$ cause errors in $F(\vec x)$ that are not represented in the linear equations for covariance prediction. Consequently, process noise Q is added to improve covariance fidelity, to prevent premature filter convergence, and to improve numerical conditioning of P. A diagonal matrix Q is assigned with constant velocity variance $q_v$, constant INS angular-rate variance $q_\omega$, constant range dynamic bias variance $q_\rho$, and constant u, v dynamic bias variance $q_{uv}$:

$$Q = \mathrm{diag}\{0\ 0\ 0\ q_v\ q_v\ q_v\ q_\omega q_\omega q_\omega q_\rho q_{uv} q_{uv}\}$$

Examples of values for parameters for an update rate of 1 Hz include

1. Mean Square (MS) velocity process noise $q_v$ (each axis): 0 $m^2/s^3$;

2. MS INS angular velocity process noise $q_\omega$ (each axis): $(2\ \mu rad/s)^2$;

3. MS dynamic range bias process noise command $q_\rho$: $(10\ m)^2$; and

4. MS dynamic u, v bias process noise command $q_{uv}$, $(1000\ \mu rad)^2$.

Lower process noise values may be used at higher data rates to allow for satisfactory disturbance rejection.

An example of the method is described as a Monte Carlo simulation of a recursive filter embedded in a truth model for a radar and a satellite orbit. A mobile phased-array radar tracks a satellite in a near-circular orbit with altitude 1500 km. As the satellite traverses the sky, the radar array rotates in azimuth and elevation in order to maintain the satellite at or near array boresight. As the radar platform is mobile, radar position, velocity, orientation, and angular rate are provided by an INS mounted on the radar array near its boresight.

Radar range and angle measurements contain random and bias errors. Random 1□ measurement errors in range are 1 m, and between 250 and 350 m in each crossrange axis (angle error scaled by range). Radar measurement biases arise from uncompensated tropospheric refraction. Real-time corrections to range and elevation (which are based on in-situ measurements of pressure, temperature and relative humidity) typically remove all but 5 to 10 pct of the total clear-air refraction errors. Residual elevation errors scale with elevation, and the largest errors typically occur below 5°.

In the example, tropospheric bias error dynamics are modeled by a Markov process having a variable time constant $\tau_A$ that scales with elevation and (absolute) elevation rate. The elevation refraction error and its elevation gradient are implicit in $\tau_A$. Although only absolute $\tau_A$ values are shown, positive $\tau_A$ values (stable response) occur with decreasing elevation, and negative $\tau_A$ values (unstable response) occur with decreasing elevation.

In weather environments, clouds can cause time-dependent refraction errors in range, elevation and azimuth. Time-dependent disturbances in range $\delta\rho$, elevation $\delta\gamma$ and azimuth $\delta\alpha$ are modeled by colored noise, or Gauss-Markov random processes with time constant $\tau_M$:

$$\frac{d}{dt}(\delta\rho) + \frac{1}{\tau_M}\delta\rho = \frac{1}{\tau_M}w_\rho, \quad E\{w_\rho\} = 0, \quad E\{w_\rho^2\}q_R$$

$$\frac{d}{dt}(\delta\gamma) + \frac{1}{\tau_M}\delta\gamma = \frac{1}{\tau_M}w_\gamma, \quad E\{w_\gamma\} = 0, \quad E\{w_\gamma^2\}q_\gamma$$

$$\frac{d}{dt}(\delta\alpha) + \frac{1}{\tau_M}\delta\alpha = \frac{1}{\tau_M}w_\alpha, \quad E\{w_\alpha\} = 0, \quad E\{w_\alpha^2\}q_\alpha$$

where $w_R$, $w_\gamma$, and $w_\alpha$ are white-Gaussian forcing functions with covariance statistics such as a Gauss-Markov time constant $\tau_M$ of 50 s, range disturbance variance $q_R$ of $(5\text{ m})^2$, elevation disturbance variance $q_\gamma$ of $(500\text{ }\mu\text{rad})^2$, and azimuth disturbance variance $q_\alpha$ of $(500\text{ }\mu\text{rad})^2$.

Time-dependent INS misalignment biases may be based on linearized Euler equations and the initial condition statistics described earlier. Although INS bias covariances do not fluctuate significantly, each yaw, pitch and roll instantiation can fluctuate dramatically during radar elevation and azimuth steering maneuvers.

Without bias estimation, tropospheric refraction errors and INS misalignments cause EKF(6) orbit determination errors in position and velocity. Crossrange position (relative to the LOS) errors scale with the product of target range and angle error, whereas crossrange velocity errors scale with the product of range rate and angle error. Radar measurements are made in a rotating frame, so Coriolis effects cause range rate errors that scale with the product of target range, angle error and LOS angular rate. Tropospheric refraction errors dominate at low elevations (below 5°, occurring early and late in the track), whereas INS misalignment errors are important at higher elevations during the mid-track interval. Although position and velocity covariances usually under-estimate the biased error statistics, covariance fidelity may be improved with bias covariance models that characterize, but do not reduce the effects of, the bias errors.

Analysis of the observability Grammian matrix indicates that the bias state variables are mathematically observable. In certain cases, 12-state observability may depend on inclusion of the second-order corrections to range associated with the misalignment biases.

Modifications, additions, or omissions may be made to the systems without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set.

Modifications, additions, or omissions may be made to the methods without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    receiving a plurality of measurements in real time, the measurements comprising a plurality of radar measurements and a plurality of radar array orientation measurements, the radar measurements generated by a radar system tracking a target, the radar measurements indicating a location of the target, the radar array orientation measurements generated by a navigation system of the radar system, the radar array orientation measurements indicating an orientation of a radar array of the radar system;
    performing the following for a number of iterations to yield a plurality of state value sets for a state variable set, the state variable set comprising one or more measurement variables and one or more dynamic bias variables, a measurement variable associated with a measurement, a dynamic bias variable associated with bias of a measurement:
        updating a state value set according to the measurements to yield an updated state value set; and
        predicting a next state value set in accordance with the updated state value set; and
    determining an orbit path of the target from the state value sets in real time.

2. The method of claim 1, the one or more bias variables comprising:
    a plurality of orientation bias variables associated with bias of an radar array orientation measurement; and
    a plurality of measurement bias variables associated with bias of a radar measurement.

3. The method of claim 1:
    the updating the state value set further comprising:
        updating the state value set and a covariance, the covariance correlating the measurement variables and the dynamic bias variables; and
    the predicting the next state value set further comprising:
        calculating the next state value set and a next covariance.

4. The method of claim 1, further comprising:
    collecting the radar measurements; and
    batch filtering the radar measurements to generate an initial state value set.

5. The method of claim 1, the performing the following to yield the plurality of state value sets further comprising:
    calculating a measurement residual according to the radar measurements and the radar array orientation measurements.

6. The method of claim 1, the updating the state value set further comprising:
    updating the state value set using a covariance that correlates the dynamic bias variables.

7. The method of claim 1, the predicting the next state value set further comprising:
    predicting the next state value set using an orbital model configured to determine a next path point from a current path point.

8. A system comprising:
    a memory configured to store a plurality of measurements in real time, the measurements comprising a plurality of radar measurements and a plurality of radar array orientation measurements, the radar measurements generated by a radar system tracking a target, the radar measurements indicating a location of the target, the radar array orientation measurements generated by a navigation system of the radar system, the radar array orientation measurements indicating an orientation of a radar array of the radar system; and
    a processor coupled to the memory and configured to:
        perform the following for a number of iterations to yield a plurality of state value sets for a state variable set, the state variable set comprising one or more measurement variables and one or more dynamic bias variables, a measurement variable associated with a measurement, a dynamic bias variable associated with bias of a measurement:
    update a state value set according to the measurements to yield an updated state value set; and
    predict a next state value set in accordance with the updated state value set; and
determine an orbit path of the target from the state value sets in real time.

9. The system of claim 8, the one or more bias variables comprising:
a plurality of orientation bias variables associated with bias of an radar array orientation measurement; and
a plurality of measurement bias variables associated with bias of a radar measurement.

10. The system of claim 8, the processor configured to:
update the state value set by:
    updating the state value set and a covariance, the covariance correlating the measurement variables and the dynamic bias variables; and
predict the next state value set by:
    calculating the next state value set and a next covariance.

11. The system of claim 8, the processor configured to:
collect the radar measurements; and
batch filter the radar measurements to generate an initial state value set.

12. The system of claim 8, the processor configured to yield the plurality of state value sets by:
calculating a measurement residual according to the radar measurements and the radar array orientation measurements.

13. The system of claim 8, the processor configured to update the state value set by:
updating the state value set using a covariance that correlates the dynamic bias variables.

14. The system of claim 8, the processor configured to predict the next state value set by:
predicting the next state value set using an orbital model configured to determine a next path point from a current path point.

15. A non-transitory computer readable medium storing computer code that instructs a computer to:
receive a plurality of measurements in real time, the measurements comprising a plurality of radar measurements and a plurality of radar array orientation measurements, the radar measurements generated by a radar system tracking a target, the radar measurements indicating a location of the target, the radar array orientation measurements generated by a navigation system of the radar system, the radar array orientation measurements indicating an orientation of a radar array of the radar system; and
perform the following for a number of iterations to yield a plurality of state value sets for a state variable set, the state variable set comprising one or more measurement variables and one or more dynamic bias variables, a measurement variable associated with a measurement, a dynamic bias variable associated with bias of a measurement:
    update a state value set according to the measurements to yield an updated state value set; and
    predict a next state value set in accordance with the updated state value set; and
determine an orbit path of the target from the state value sets in real time.

16. The non-transitory computer readable medium of claim 15, the one or more bias variables comprising:
a plurality of orientation bias variables associated with bias of an radar array orientation measurement; and
a plurality of measurement bias variables associated with bias of a radar measurement.

17. The non-transitory computer readable medium of claim 15, wherein the computer code instructs the computer to:
update the state value set by:
    updating the state value set and a covariance, the covariance correlating the measurement variables and the dynamic bias variables; and
predict the next state value set by:
    calculating the next state value set and a next covariance.

18. The non-transitory computer readable medium of claim 15, wherein the computer code further instructs the computer to:
collect the radar measurements; and
batch filter the radar measurements to generate an initial state value set.

19. The non-transitory computer readable medium of claim 15, wherein the computer code instructs the computer to yield the plurality of state value sets by:
calculating a measurement residual according to the radar measurements and the radar array orientation measurements.

20. The non-transitory computer readable medium of claim 15, wherein the computer code instructs the computer to update the state value set by:
updating the state value set using a covariance that correlates the dynamic bias variables.

21. The non-transitory computer readable medium of claim 15, wherein the computer code instructs the computer to predict the next state value set by:
predicting the next state value set using an orbital model configured to determine a next path point from a current path point.

\* \* \* \* \*